US011526966B2

(12) United States Patent
Furuki et al.

(10) Patent No.: US 11,526,966 B2
(45) Date of Patent: Dec. 13, 2022

(54) IMAGE PROCESSING DEVICE, IMAGE PROCESSING METHOD, AND STORAGE MEDIUM STORING IMAGE PROCESSING PROGRAM

(71) Applicant: MITSUBISHI ELECTRIC CORPORATION, Tokyo (JP)

(72) Inventors: Ichiro Furuki, Tokyo (JP); Kohei Okahara, Tokyo (JP); Tsukasa Fukasawa, Tokyo (JP); Nobuo Matsumura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 137 days.

(21) Appl. No.: 17/035,386

(22) Filed: Sep. 28, 2020

(65) Prior Publication Data

US 2021/0012467 A1 Jan. 14, 2021

Related U.S. Application Data

(63) Continuation of application No. PCT/JP2018/015383, filed on Apr. 12, 2018.

(51) Int. Cl.
*G06K 9/40* (2006.01)
*G06T 5/00* (2006.01)
(Continued)

(52) U.S. Cl.
CPC .............. *G06T 5/002* (2013.01); *G06T 5/007* (2013.01); *G06T 7/20* (2013.01); *G06T 7/70* (2017.01); *G06T 2207/20021* (2013.01)

(58) Field of Classification Search
None
See application file for complete search history.

(56) References Cited

U.S. PATENT DOCUMENTS 7,587,099 B2 9/2009 Szeliski et al.
8,830,362 B2 9/2014 Nguyen et al.
(Continued)

FOREIGN PATENT DOCUMENTS

CN 105208376 A 12/2015
JP 2005-94087 A 4/2005
(Continued)

OTHER PUBLICATIONS

Kanj, "Flicker Removal and Color correction for High Speed Video", Chapter 5 Block matching-based colorimetric correction, Other [cs.OH], Université Paris-Est, 2017 (Year: 2017).*
(Continued)

*Primary Examiner* — Randolph I Chu
(74) *Attorney, Agent, or Firm* — Birch, Stewart, Kolasch & Birch, LLP

(57) ABSTRACT

An image processing device includes a processor; and a memory to store the program which performs processing including: measuring a first texture amount indicating luminance variation in image regions, based on the image regions obtained by dividing the captured image and previously determining an image processing target region based on the first texture amount; judging whether the image processing on a current captured image is necessary based on luminance of the image processing target region in the current captured image; calculating a second texture amount indicating luminance variation in the image processing target region, and judging whether the image processing should be performed on the image processing target region or not based on the second texture amount; and performing the image processing on the image processing target region on which the judging based on the second texture amount is that the image processing should be performed.

14 Claims, 7 Drawing Sheets

(51) Int. Cl.
*G06T 7/70* (2017.01)
*G06T 7/20* (2017.01)

(56) References Cited

U.S. PATENT DOCUMENTS

| | | | |
|---|---|---|---|
| 9,639,771 B2 | 5/2017 | Mine et al. | |
| 2008/0111901 A1 | 5/2008 | Kawashima | |
| 2008/0152256 A1* | 6/2008 | Ou | G06T 5/20 382/276 |
| 2009/0096897 A1 | 4/2009 | Saito | |
| 2010/0239164 A1* | 9/2010 | Wang | G06T 5/20 382/172 |
| 2011/0234817 A1 | 9/2011 | Sakamoto | |
| 2014/0320934 A1* | 10/2014 | Muraishi | H04N 1/4074 358/453 |
| 2016/0189354 A1* | 6/2016 | Kikuchi | G06T 5/40 382/167 |

FOREIGN PATENT DOCUMENTS

| | | |
|---|---|---|
| JP | 2006-270274 A | 10/2006 |
| JP | 2008-124591 A | 5/2008 |
| JP | 2011-199750 A | 10/2011 |
| JP | 5509610 B2 | 6/2014 |
| WO | WO 2007/049634 A1 | 5/2007 |

OTHER PUBLICATIONS

Indian Office Action for Indian Application No. 202047035332, dated Nov. 24, 2021, with English translation.
Cortelazzo et al , "Noise Reduction Techniques for VIdeo Coding Appitcations," Noblesse Workshop on Non-Linear Model Based Image Analysis. Springer, London, England, 1998, pp. 309-313 (total 7 pages).
German Office Action, dated Jun. 24, 2021, for German Application No. 112018007250.4, with an English translation.
Mahasseni et at., "Budget-Aware Deep Semantic Video Segmentation," Proceedings of the IEEE Conference on Computer Vision and Pattern Recognition. 2017, pp. 1029-1038.
Manikka-Baduge, et al. "Texture Analysis Using Lacunarity and Average Local Variance," SPIE Medical Imaging, 2009: Image Processing, (Proc. of SPIE, vol. 7259), Mar. 27, 2009, Lake Buena Vista, USA, pp. 725953-1-725953-12 (total 13 pages).
Chinese Office Action and Search Report for Chinese Application No. 201880091964.8, dated Jun. 3, 2021, with English translation of the Office Action.

* cited by examiner

IMAGE PROCESSING DEVICE, IMAGE PROCESSING METHOD, AND STORAGE MEDIUM STORING IMAGE PROCESSING PROGRAM

CROSS-REFERENCE TO RELATED APPLICATION

This application is a continuation application of International Application No. PCT/JP2018/015383 having an international filing date of Apr. 12, 2018.

BACKGROUND OF THE INVENTION

1. Field of the Invention

The present invention relates to an image processing device, an image processing method, and an image processing program.

2. Description of the Related Art

When noise reduction processing is performed on captured image data (hereinafter referred to also as a "captured image") acquired by an image capturing device, there are cases where a minute part of a subject in the captured image is blurred, that is, image quality is degraded. As a countermeasure against this problem, there has been proposed a device that judges whether the noise reduction processing is necessary or not based on the luminance of the captured image and performs the noise reduction processing on the captured image when the noise reduction processing is judged to be necessary (see Patent Reference 1, for example).

Patent Reference 1: Japanese Patent Application Publication No. 2005-94087

However, the conventional device described above is unsuitable for systems for monitoring the outdoor scene in the nighttime since the device performs the noise reduction processing when the captured image is dark. For example, when the noise reduction processing is performed on a captured image including a road that is dark and airspace above the road, a problem arises in that an image region of the road and an object (e.g., vehicle) on the road that have high monitoring priority is blurred.

SUMMARY OF THE INVENTION

An object of the present invention, which has been made to resolve the above-described problem with the conventional technology, is to provide an image processing device, an image processing method and an image processing program that do not cause the blurring to an image region having high monitoring priority even when the noise reduction processing is performed.

An image processing device according to an aspect of the present invention is a device that performs image processing for reducing noise in a captured image, including: a processor to execute a program; and a memory to store the program which, when executed by the processor, performs processing including measuring a first texture amount indicating luminance variation in a plurality of image regions, based on the plurality of image regions obtained by dividing the captured image and previously determining an image processing target region to be a target of the image processing based on the first texture amount; judging whether the image processing on a current captured image is necessary or not based on luminance of the image processing target region in the current captured image; calculating a second texture amount indicating luminance variation in the image processing target region for which the image processing is judged to be necessary in said judging based on the luminance, and judging whether the image processing should be performed on the image processing target region or not based on the second texture amount; and performing the image processing on the image processing target region on which said judging based on the second texture amount is that the image processing should be performed.

An image processing method according to another aspect of the present invention is a method of performing image processing for reducing noise in a captured image, including: measuring a first texture amount indicating luminance variation in a plurality of image regions, based on the plurality of image regions obtained by dividing the captured image and previously determining an image processing target region to be a target of the image processing based on the first texture amount; judging whether the image processing on a current captured image is necessary or not based on luminance of the image processing target region in the current captured image; calculating a second texture amount indicating luminance variation in the image processing target region for which the image processing is judged to be necessary in the judging based on the luminance, and judging whether the image processing should be performed on the image processing target region or not based on the second texture amount; and performing the image processing on the image processing target region on which the judging based on the second texture amount is that the image processing should be performed.

According to the present invention, the blurring of an image region having high monitoring priority can be prevented even when the noise reduction processing is performed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Image processing devices, image processing methods and image processing programs according to embodiments of the present invention will be described below with reference to the accompanying drawings. The following embodiments are just examples and a variety of modifications are possible within the scope of the present invention.

(1) First Embodiment (1-1) Configuration

Figure 1:
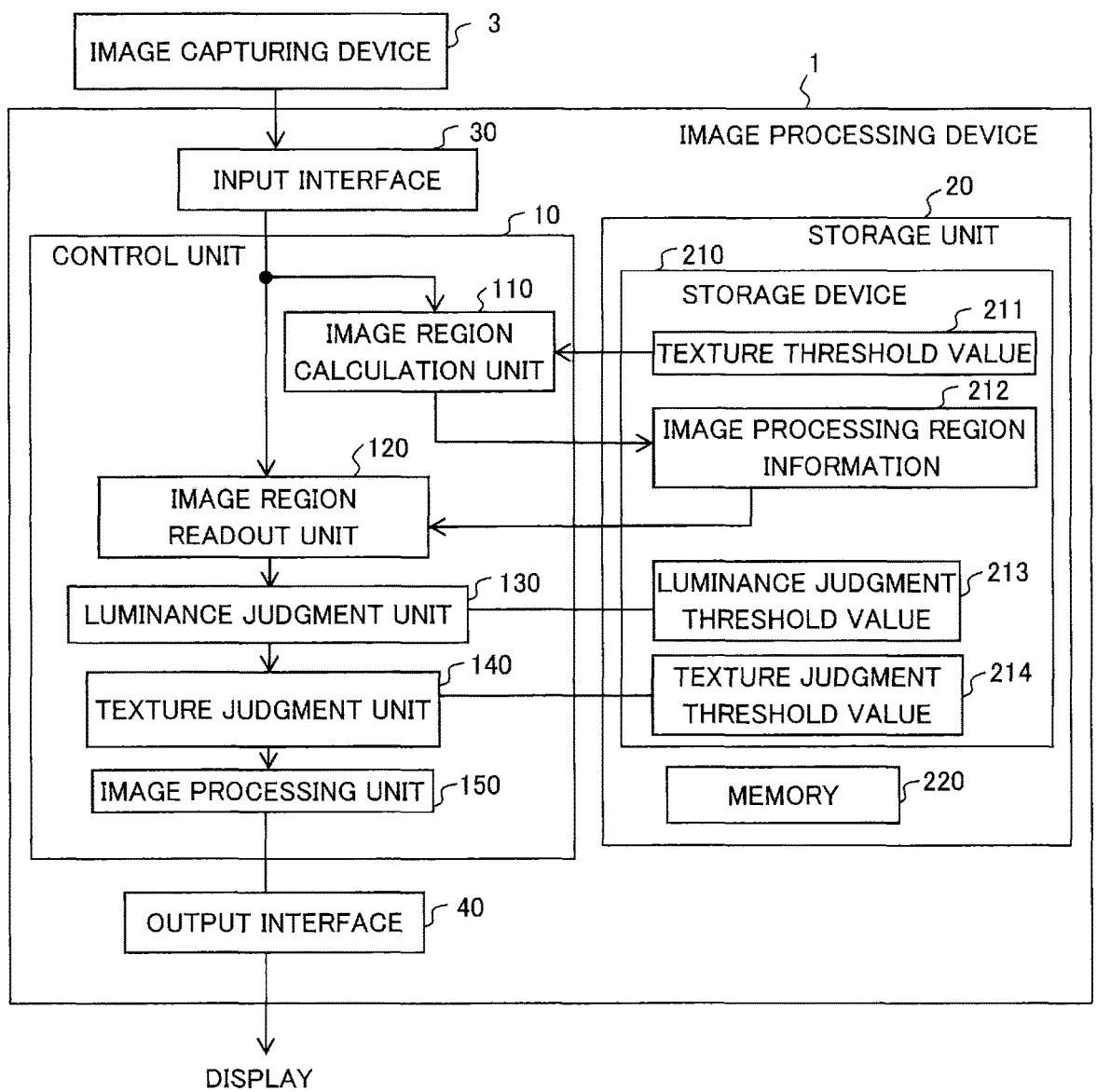
FIG. 1 is a block diagram schematically showing a configuration of an image processing device according to a first embodiment of the present invention.
Figure 2:
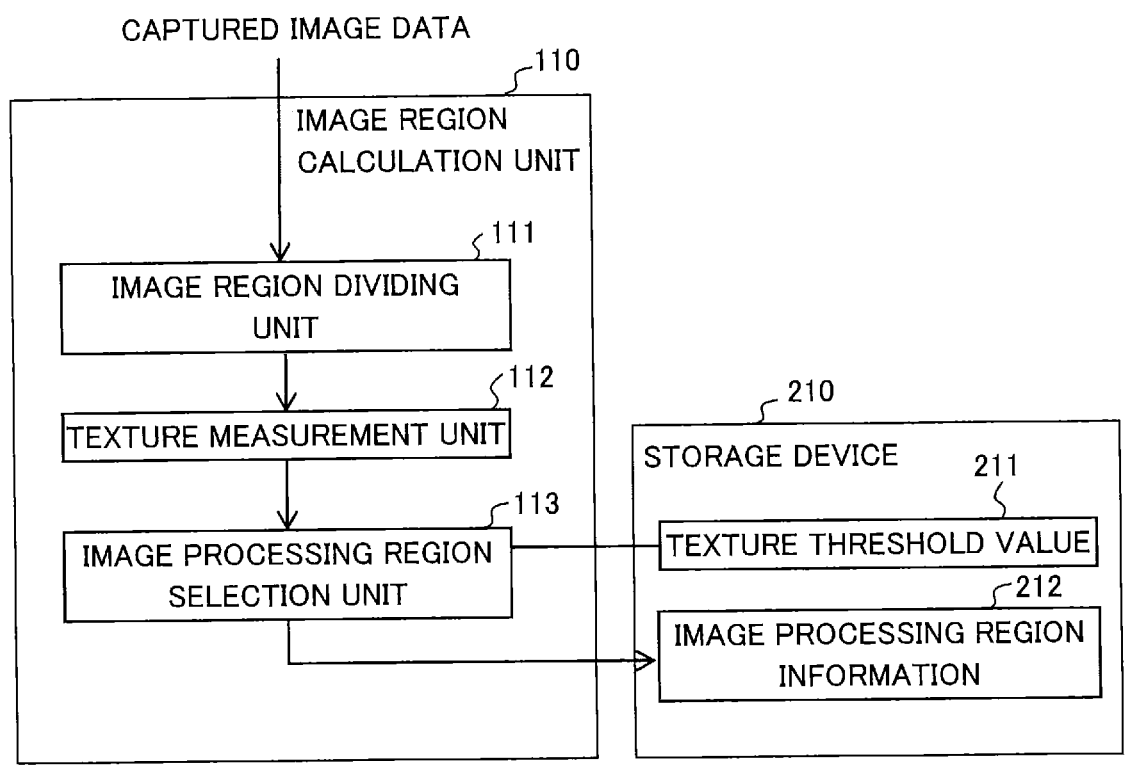
FIG. 2 is a block diagram schematically showing a configuration of an image region calculation unit in FIG. 1.

FIG. 1 is a block diagram schematically showing a configuration of an image processing device 1 according to a first embodiment. FIG. 2 is a block diagram schematically showing a configuration of an image region calculation unit 110 in FIG. 1. The image processing device 1 is a device capable of executing an image processing method according to the first embodiment. The image processing device 1 can also be a computer capable of executing an image processing program according to the first embodiment.

As shown in FIG. 1, the image processing device 1 includes a control unit 10, a storage unit 20, an input interface 30 and an output interface 40. The control unit 10 includes the image region calculation unit 110, an image region readout unit 120, a luminance judgment unit 130, a texture judgment unit 140 and an image processing unit 150. As shown in FIG. 2, the image region calculation unit 110 includes an image region dividing unit 111, texture measurement unit 112 and an image processing region selection unit 113.

The control unit 10 includes, for example, one or more processors for processing information, namely, one or more ICs (Integrated Circuits) for performing processing. Specifically, the control unit 10 includes one or more CPUs (Central Processing Units). The control unit 10 is capable of controlling other hardware. The control unit 10 is capable of executing software stored in the storage unit 20.

The control unit 10 stores information, data, signal values, variable values, etc. in a storage device 210, a memory 220, or a register or cache memory in the control unit 10. In FIG. 1, each arrow connecting a component in the control unit 10 and the storage device 210 indicates that the component in the control unit 10 stores the result of processing in the storage device 210 or that the component in the control unit 10 loads information from the storage device 210. Arrows connecting components in the control unit 10 together indicate the flow of processing. Incidentally, while there are cases where image information is transferred between components in the control unit 10 via the memory 220 in FIG. 1, arrows or connection lines connecting the memory 220 and the components in the control unit 10 are not shown in FIG. 1.

A non-transitory computer-readable storage medium storing a program such as an image processing program that implements the functions of the control unit 10 may be stored in a memory (e.g., the storage unit 20) as a portable record medium such as a magnetic disk, a flexible disk, an optical disk, a compact disc, a Blu-ray (registered trademark) disc or a DVD (Digital Versatile Disc).

The storage unit 20 is an information storage means for storing information. The storage unit 20 includes one or more storage devices 210 and one or more memories 220. The storage device 210 includes a ROM (Read Only Memory), a flash memory or an HDD (Hard Disk Drive), for example. The memory 220 includes a RAM (Random Access Memory), for example. Incidentally, the storage unit 20 is not limited to the configuration shown in FIG. 1.

The storage device 210 stores, for example, a texture threshold value 211 as a predetermined first threshold value to be used when an image capture region is divided, image processing region information 212, a predetermined luminance judgment threshold value 213 to be used for judging the necessity of image processing, and a texture judgment threshold value 214 as a predetermined second threshold value to be used similarly for judging the necessity of image processing.

The storage device 210 may store an image processing program for implementing the functions of the control unit 10. This image processing program is loaded into the memory 220, loaded in by the control unit 10, and executed by the control unit 10. In cases where the image processing device 1 is a computer, an OS (Operating System) may be stored in the storage device 210. At least part of the OS is loaded into the memory 220, and the control unit 10 executes the image processing program while executing the OS.

The input interface 30 is a port to be connected to an image capturing device 3. The input interface 30 is an image input interface that takes a captured image acquired by the image capturing device 3 into the image processing device 1. The captured image taken in by the input interface 30 is stored in the memory 220, for example. The input interface 30 may be equipped with a port to be connected to an input device (i.e., user operation unit) such as a mouse, a keyboard, or a touch panel. The input interface 30 can be a port to be connected to a network such as a LAN (Local Area Network) (registered trademark), for example. The input interface 30 can be a USB (Universal Serial Bus) terminal. The input interface 30 can be a capture board capable of taking a video signal according to SDI (Serial Digital Interface), HDMI (registered trademark) (High Definition Multimedia Interface), VGA (Video Graphics Array), DVI (Digital Video Interface) or component into the image processing device 1.

The output interface 40 is a port to which a cable of a display device such as a display is connected. The output interface 40 is a USB terminal or an HDMI (registered trademark) terminal, for example. The display is an LCD (Liquid Crystal Display), for example.

(1-2) Operation

Figure 3:
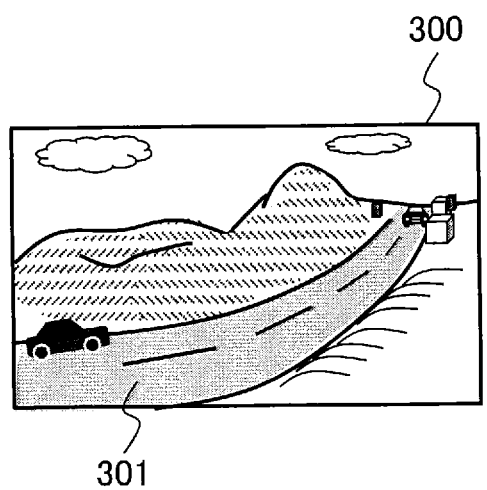
FIG. 3 is a diagram showing an example of a captured image acquired by an image capturing device.

FIG. 3 is a diagram showing an example of a captured image acquired by the image capturing device 3. In the example of FIG. 3, image capture objects include a road 301 and vehicles traveling on the road 301. The image capturing device 3 is, for example, a monitoring camera for monitoring road conditions. Monitoring targets (subjects) are vehicles traveling on the road in a lower part of the captured image 300. Airspace is captured in an upper part of the captured image 300.

The image capturing device 3 is camera equipment including image pickup devices like CCDs (Charged-Coupled Devices) or CMOSs (Complementary Metal-Oxide-Semiconductors) and a lens. The image capturing device 3 is a fixed camera, for example. Further, the image capturing device 3 is desired to have the AGC (Automatic Gain Control) function. AGC is variable control for keeping the output at a constant level by raising sensitivity when the input signal is weak (field illuminance is low) and lowering the sensitivity when the input signal is strong (the field illuminance is high). The image capturing device 3 provides the image processing device 1 with the captured image.

Figure 4:
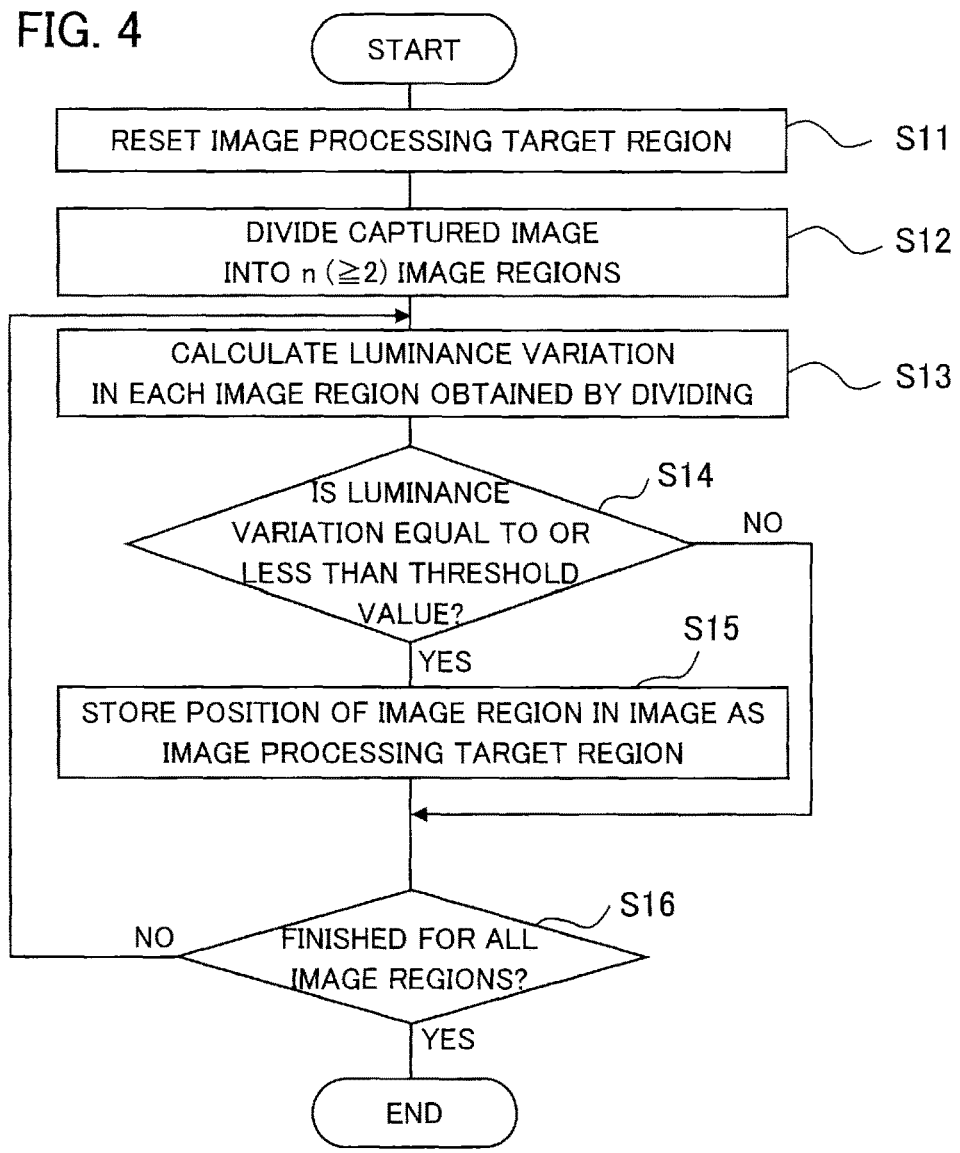
FIG. 4 is a flowchart showing a captured image region dividing operation and an image processing target region selection operation performed by the image processing device according to the first embodiment.

FIG. 4 is a flowchart showing a captured image region dividing operation and an image processing target region selection operation performed by the image processing device 1.

First, the image processing device 1 resets the image processing region information 212 in the storage device 210 (step S11). Namely, the image processing device 1 makes the storage device 210 store information indicating that there is no image processing region information 212.

Subsequently, a captured image acquired by the image capturing device 3 is taken into the image processing device 1 by the input interface 30, temporarily held in the memory 220, and thereafter sent to the image region calculation unit 110. The image region dividing unit 111 of the image region calculation unit 110 performs a process of detecting edge parts in the captured image having great image density difference (i.e., outlines in the image) and divides the image into n (n≥2) image regions based on edge information indicating the edge parts (step S12). Namely, the image region calculation unit 110 performs a dividing process for dividing the captured image into image regions having high monitoring priority and image regions having low monitoring priority, for example.

Subsequently, the texture measurement unit 112 of the image region calculation unit 110 measures a first texture amount in each of the image regions obtained by the dividing. The first texture amount is measured as variance indicating variation (i.e., luminance variation) in a pixel value (i.e., luminance value) in each of the image regions obtained by the dividing (step S13).

Subsequently, the image processing region selection unit 113 of the image region calculation unit 110 judges whether or not the first texture amount (i.e., the luminance variation) of each of the image regions obtained by the dividing is less than or equal to the predetermined texture threshold value 211 (step S14).

The image processing region selection unit 113 of the image region calculation unit 110 selects, from the image regions obtained by the dividing, a region whose first texture amount is less than or equal to the texture threshold value 211 as an image processing target region, and previously stores position information indicating the position of the image region selected as the image processing target region in the captured image in the storage device 210 as the image processing region information 212 (step S15).

The processing of the steps S13 to S15 is repeated until the processing is performed on all the image regions obtained by the dividing (step S16). When the first texture amount of every image region obtained by the dividing exceeds the texture threshold value 211, "nonexistence" information indicating that there exists no image processing target region is stored as the image processing region information 212.

In the first embodiment, a region having high monitoring priority is a ground surface part including the road 301, whereas the monitoring priority of the airspace is low. The image processing region selection unit 113 selects an image region in which the first texture amount is small (i.e., the luminance variation is small), like the airspace, as the image processing target region.

Incidentally, the process by the image region calculation unit 110 does not have to be executed constantly; it is permissible if the process is executed before starting the monitoring operation, periodically (intermittently) during the monitoring operation, or when a change occurred in the monitoring region, for example, that is, at predetermined time points. This makes it possible to avoid placing an excessive calculation load on the image processing device 1. Further, by executing the process of the image region calculation unit 110 when the field illuminance is high (bright), accuracy of the region dividing can be increased since the difference in the first texture amount among image regions in the captured image is large.

Figure 5:
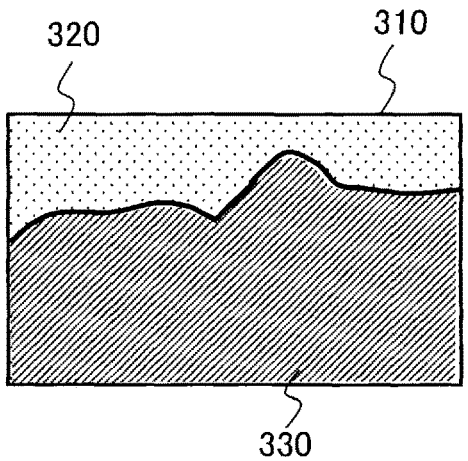
FIG. 5 is a diagram showing an example of a divided region image obtained by dividing the captured image into two image regions in the image processing device according to the first embodiment.

FIG. 5 is a diagram showing an example of a divided region image obtained by dividing the captured image 300 into two image regions. In the example of FIG. 5, the divided region image 310 has been divided into two image regions: an image region 330 in which the first texture amount is large and an image region 320 in which the first texture amount is small (corresponding to the airspace in FIG. 3). In this case, the image processing target region is the image region 320 in which the first texture amount is small (i.e., the luminance variation is small).

Figure 6:
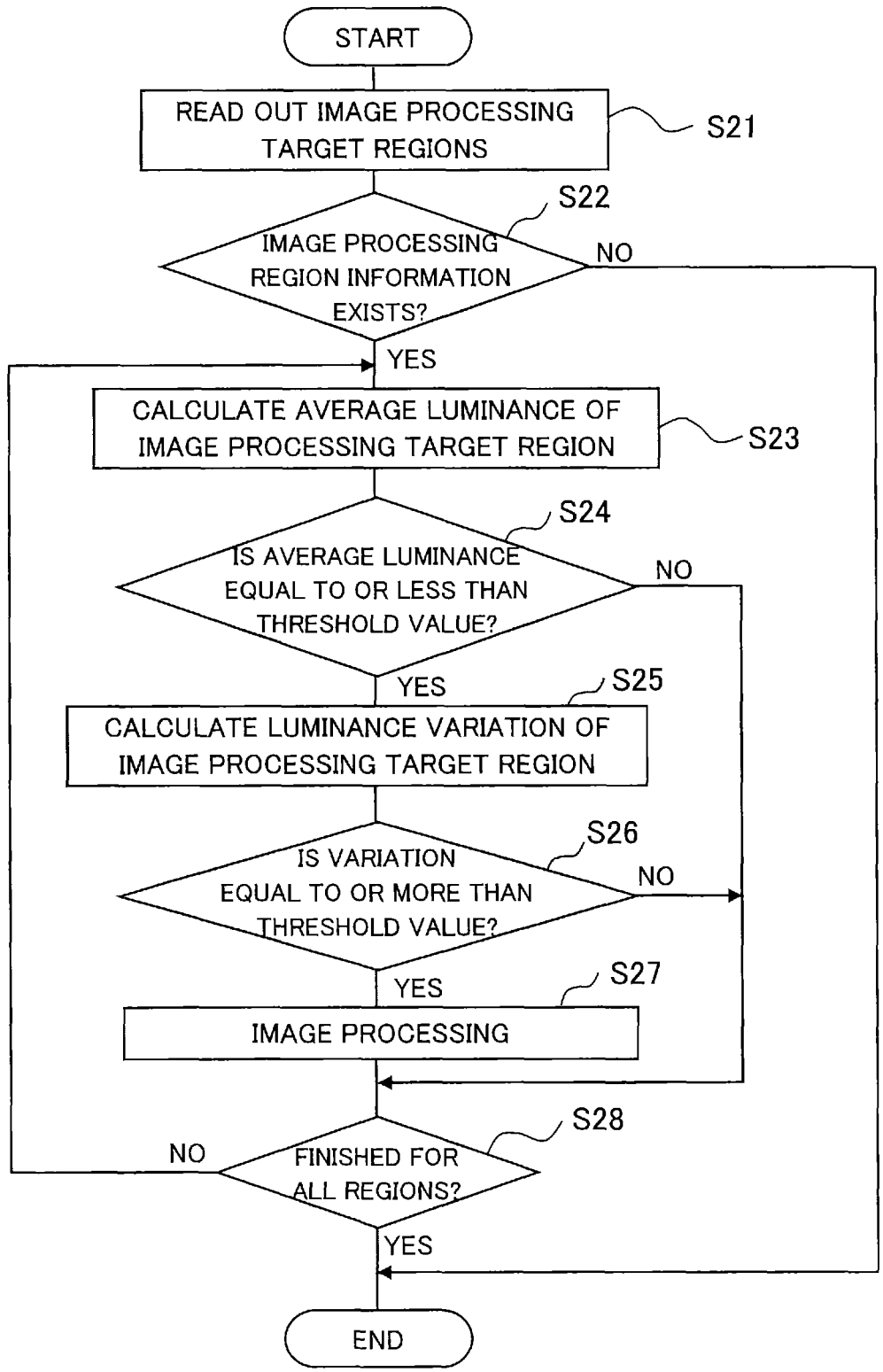
FIG. 6 is a flowchart showing an operation of judging whether image processing should be applied to each image processing target region or not in the image processing device according to the first embodiment.

FIG. 6 is a flowchart showing an operation of judging whether the image processing should be applied to each image processing target region or not. First, the image region readout unit 120 reads out the image processing region information stored in the storage device 210 (step S21). The image region readout unit 120 judges whether or not the image processing region information 212 exists in the storage device 210 (step S22), and ends the process without executing the image processing when no image processing region information 212 exists (NO in the step S22).

When the image processing region information 212 exists (YES in the step S22), the luminance judgment unit 130 calculates average luminance of the image processing target region in the captured image based on the image processing region information 212 (step S23).

Subsequently, the luminance judgment unit 130 judges whether or not the calculated average luminance is less than or equal to the luminance judgment threshold value 213 previously stored in the storage device 210 (step S24). When the average luminance of the image processing target region is less than or equal to the luminance judgment threshold value 213, the luminance judgment unit 130 judges that the field illuminance is low (dark) and thus image capture sensitivity has been set high by the AGC function of the image capturing device 3, noise is likely to occur in the captured image, and the image processing is necessary. In contrast, when the average luminance of the image processing target region is higher than the luminance judgment threshold value 213, the luminance judgment unit 130 judges that the field illuminance is high (bright) and there is no need to execute the image processing such as noise correction.

When the average luminance is judged to be less than or equal to the luminance judgment threshold value 213 in the step S24 (YES in the step S24), the texture judgment unit 140 calculates a second texture amount (i.e., luminance variation) of the image processing target region of the current captured image, that is, the monitoring target captured image acquired by the image capturing device 3 (step S25) and compares the calculated second texture amount with the texture judgment threshold value 214 as the second threshold value previously stored in the storage device 210 (step S26). Incidentally, while the second texture amount (i.e., luminance variation) may be obtained as the variance of the pixel values in the image processing target region, it is desirable to obtain the second texture amount as a variation coefficient (i.e., standard deviation/mean value) of the pixel values in the image processing target region which is independent of the absolute values of the pixel values in the image processing target region.

When the second texture amount (i.e., luminance variation) is larger than or equal to the texture judgment threshold value 214 (YES in the step S26), the image processing unit 150 judges that the noise in the image processing target region is high and executes the image processing for correcting (reducing) the noise (step S27). When the second texture amount (i.e., luminance variation) is less than the texture judgment threshold value 214 (NO in the step S26), the image processing unit 150 judges that the noise in the image processing target region is low and judges that the image processing for correcting (reducing) the noise is unnecessary. The processing of the steps S23 to S27 is executed for all the image processing target regions (step S28).

The image after the image processing that has been generated as above is outputted to the display device such as a display via the output interface 40. Incidentally, the image processing mentioned here means processing for reducing (correcting) noise occurring in the image. The image processing can be processing by use of a smoothing filter, for example. However, the method of the image processing is not limited to such methods; the image processing can be other processing as long as it is processing for reducing noise occurring in the image.

(1-3) Effect

In the captured image 300 shown in FIG. 3, when the field illuminance is low (dark) like in the nighttime, noise is likely to occur in the captured image, especially in the airspace far from the image capturing device 3 in the captured image 300. Even though an observer wants to see the lower part of the screen (road 301, vehicle) as the region of high monitoring priority, the whole screen becomes an image that is hard to see due to the influence of the noise occurring in the upper part of the screen (airspace) having low monitoring priority. Especially when the captured image 300 is motion video, the noise is perceived as flickering of the video and the captured image 300 becomes an image (video) that is still harder to see. With the image processing device 1 according to the first embodiment, the captured image acquired by the image capturing device 3 as a monitoring camera is divided into a plurality of image regions and the noise correction processing is performed on regions of low monitoring priority, by which a monitoring image that is easy to see can be obtained since the noise in the regions of low monitoring priority can be reduced and the image blurring due to the influence of the noise correction does not occur in regions of high monitoring priority.

Further, the calculation load on the image processing device 1 can be reduced since the image processing device 1 is configured so that the region judgment process needing image processing is executed before starting the monitoring operation, periodically (intermittently) during the monitoring operation, or when a change occurred in the monitoring region.

Furthermore, the accuracy of the judgment on whether the noise correction processing is necessary or not increases since the judgment on whether the noise correction processing is necessary or not is made based on the average luminance and the luminance variation (variation coefficient) in the region of low monitoring priority that is the noise correction processing target. Accordingly, unnecessary noise correction is not carried out and the image quality degradation due to the unnecessary image processing can be prevented.

(2) Second Embodiment (2-1) Configuration

In the first embodiment, the description is given of a case where the subject that should be monitored is situated outside the image processing target regions. In a second embodiment, a description will be given of an operation of image processing (i.e., noise correction processing) in a case where a subject as one of monitoring targets is situated in an image processing target region.

Figure 7:
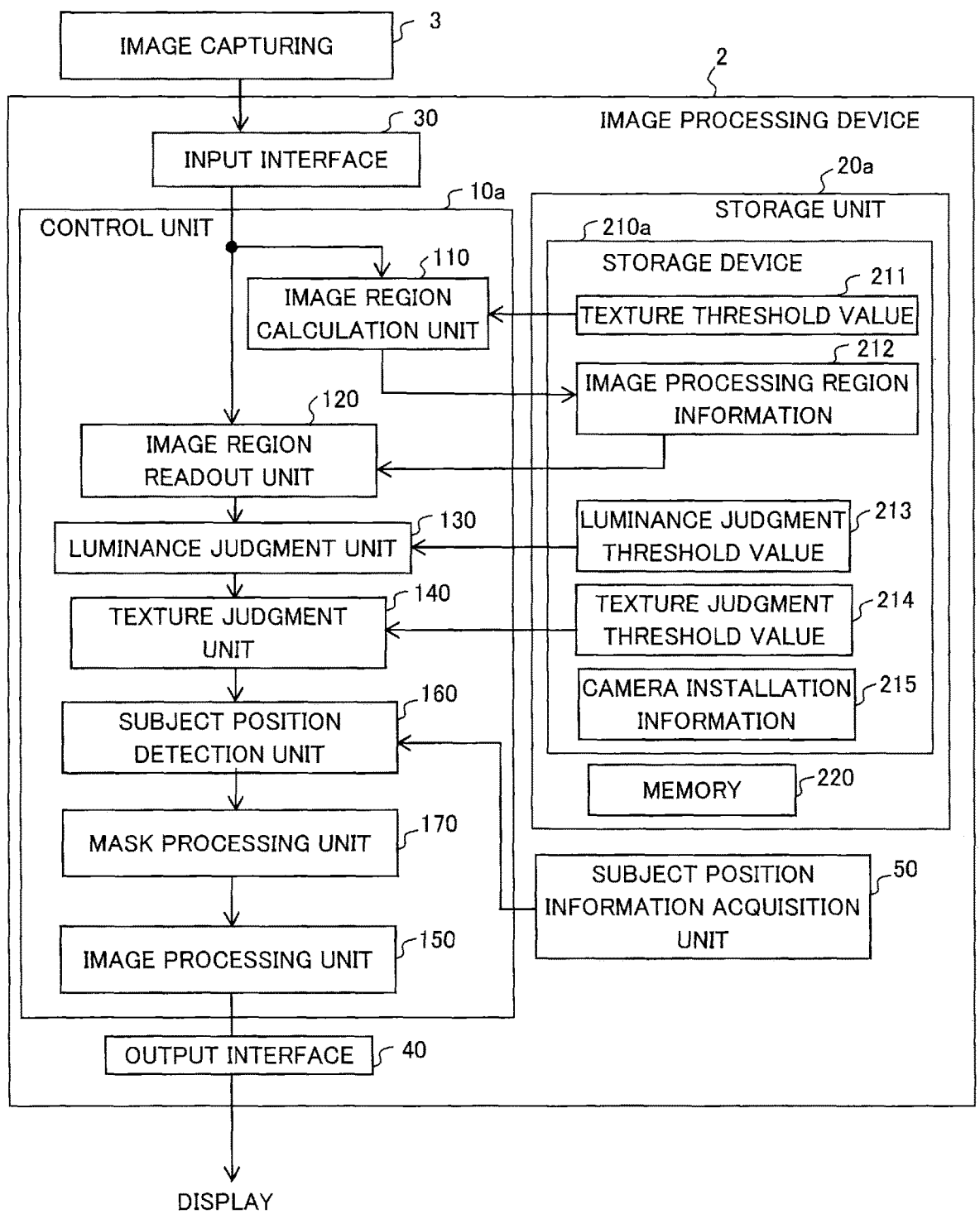
FIG. 7 is a block diagram schematically showing a configuration of an image processing device according to a second embodiment of the present invention.

FIG. 7 is a block diagram schematically showing a configuration of an image processing device 2 according to the second embodiment. In FIG. 7, each component identical or corresponding to a component shown in FIG. 1 is assigned the same reference character as in FIG. 1. The image processing device 2 is a device capable of executing an image processing method according to the second embodiment. The image processing device 2 can also be a computer capable of executing an image processing program according to the second embodiment.

As shown in FIG. 7, the image processing device 2 includes a control unit 10a, a storage unit 20a, the input interface 30, the output interface 40, and a subject position information acquisition unit 50 that acquires real space position information on the subject. The control unit 10a includes the image region calculation unit 110, the image region readout unit 120, the luminance judgment unit 130, the texture judgment unit 140, a subject position detection unit 160 that transforms a subject position in the real space into a position in a camera image captured by the image capturing device 3, a mask processing unit 170 that determines a region in the image processing target region on which the image processing is not performed, and the image processing unit 150. The storage unit 20a includes one or more storage devices 210 and one or more memories 220. The storage device 210a stores, for example, a predetermined texture threshold value 211, the image processing region information 212, a predetermined luminance judgment threshold value 213, a predetermined texture judgment threshold value 214, and camera installation information 215 indicating installation position information on the image capturing device 3.

(2-2) Operation

The operation of the image processing device 2 according to the second embodiment until the selection of the image processing target regions is the same as that in the first embodiment (i.e., the operation shown in FIG. 4).

Figure 8:
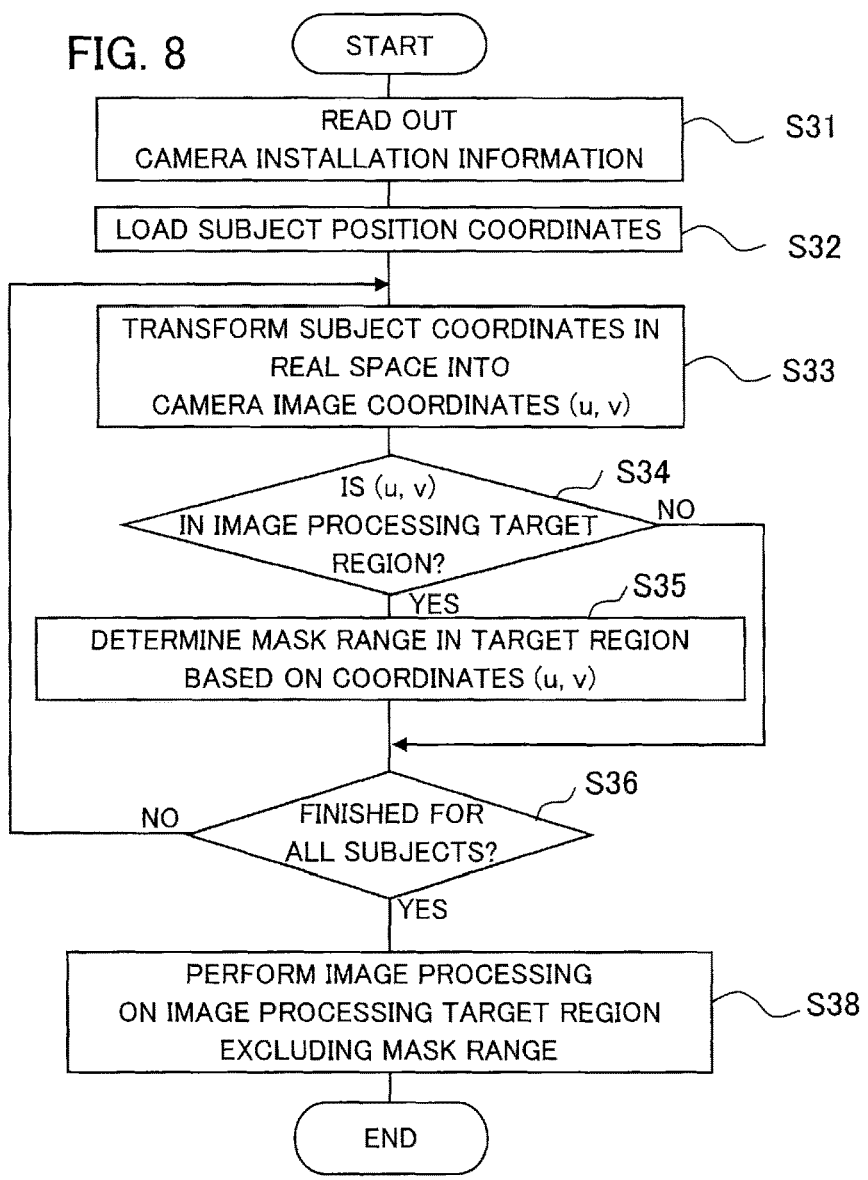
FIG. 8 is a flowchart showing the operation of a subject position detection unit, a mask processing unit, and an image processing unit of the image processing device according to the second embodiment.

FIG. 8 is a flowchart for explaining the operation of the subject position detection unit 160, the mask processing unit 170 and the image processing unit 150 of the image processing device 2 according to the second embodiment.

When the texture judgment unit 140 judges that the image processing (i.e., noise correction processing) on the image processing target region is necessary, the subject position detection unit 160 reads out the camera installation information 215 on the image capturing device 3 (i.e., camera) previously stored in the storage device 210 and reads out position information on the subject from the subject position information acquisition unit 50 (steps S31 and S32). Here, the camera installation information 215 includes the field angle and the focal length of the camera, the image size (the number of pixels) of the camera, and coordinate information indicating the camera position in the real space (world coordinate system). The position information on the subject includes coordinate information indicating the subject position in the real space. The camera installation information 215 is previously acquired when the image capturing device 3 is installed. The subject position information sent from the subject position information acquisition unit 50 is, for example, GPS information (e.g., latitude, longitude, and altitude) acquired by a GPS (Global Positioning System) module mounted on the subject and transmitted from a transmitter provided on the subject. In this case, the subject position information acquisition unit 50 includes a GPS receiver. The subject in the second embodiment is, for example, an unmanned aircraft (e.g., drone) equipped with a GPS module.

Subsequently, the subject position detection unit 160 transforms the subject position in the real space coordinate system into a coordinate position in the image as viewed from the image capturing device 3 based on the subject position information and the camera installation information 215 (step S33). Specifically, the subject position detection unit 160 first transforms the subject position in the real space coordinate system into that in a camera coordinate system and then transforms the position into coordinates in the image captured by the image capturing device 3. The camera coordinate system is, for example, a coordinate system in which the lens center of the image capturing device 3 being a camera is placed at the origin. The subject position information (world coordinate system) can be transformed into that in the camera coordinate system based on the camera installation information 215 (the lens position coordinates, the direction of the optical axis, etc. in the world coordinate system). Subsequently, the subject position detection unit 160 transforms the subject position coordinates, after the transformation into the camera coordinate system, into camera image coordinates.

Figure 9:
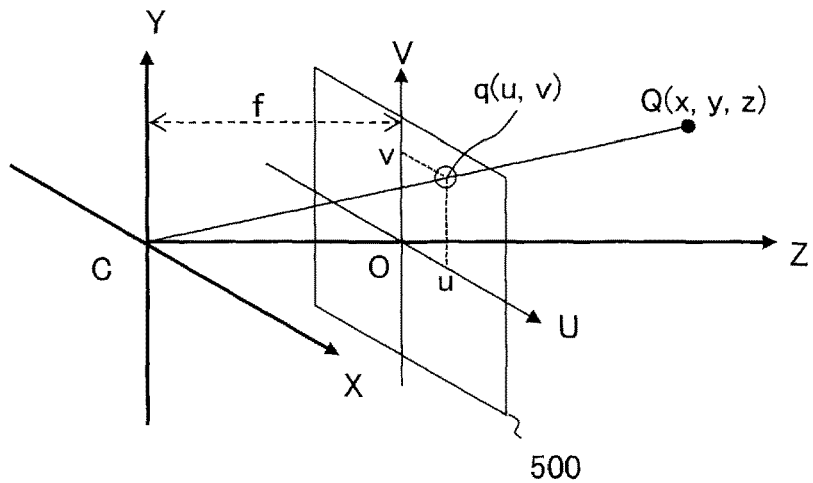
FIG. 9 is an explanatory diagram showing a process of transforming subject coordinates in a camera coordinate system into subject coordinates in a camera image coordinate system.

FIG. 9 is an explanatory diagram showing the process of transforming the subject coordinates in the camera coordinate system into the camera image coordinates. In FIG. 9, C represents the origin (lens center) of the camera coordinate system, and the Z-axis represents a straight line (optical axis) passing through the origin C and orthogonal to the lens surfaces. The notation (x, y, z) represents the camera coordinates of the subject Q existing in the real space. A camera image plane 500 is situated at a position that is separate from the origin C of the camera coordinate system by the focal length f. Coordinate axes U and V of the camera image plane 500 are respectively in parallel with coordinate axes X and Y of the camera coordinate system. The notation (u, v) represents the coordinates of the subject q (indicated by an open circle in FIG. 9) on the camera image plane 500. In this case, the coordinates (u, v) of q are obtained by the following expressions:

$$u = f \cdot (x/z) \quad (1)$$

$$v = f \cdot (y/z) \quad (2)$$

Accordingly, the position of the subject Q can be indicated on the camera image if there is the coordinate position (x, y, z) of the subject Q in the camera coordinate system, that is, the information on the latitude, the longitude and the height (altitude) of the subject Q in the real space coordinate system. Incidentally, information on the focal length f is included in the camera installation information 215.

Subsequently, the subject position detection unit 160 judges whether or not the subject coordinates q(u, v) on the camera image 400 is included in the image processing target region (step S34). If q(u, v) is included in the image processing target region (YES in the step S34), the subject position detection unit 160 sets a vicinal region of the coordinates (u, v) including the coordinates (u, v), e.g., an m×n rectangular range, as a mask range on which the image processing is not performed (step S35). Incidentally, m and n are integers larger than or equal to 2. In this case, the size of the m×n rectangular range as the mask range as the region on which the image processing is not performed may be determined based on a distance between the subject and the image capturing device 3. For example, the mask range is set to be small when the distance from the subject to the image capturing device 3 is long, and the mask range is set to be large when the distance from the subject to the image capturing device 3 is short. The distance from the subject to the image capturing device 3 can be obtained from the camera installation information 215 and the subject position information acquired from the subject position information acquisition unit 50. Incidentally, the shape of the mask range is not limited to a rectangular shape but can also be a different shape such as a circular shape.

When q(u, v) is judged not to be included in the image processing target region in the step S34, the processing of the step S35 is not executed and the processing of the steps S33 to S35 is executed for the next (another) subject (step S36). When the processing for all the subjects is finished, the image processing unit 150 performs the noise correction processing as the image processing on the image processing target region excluding the region that has been set as the mask range (step S38).

Figure 10A:
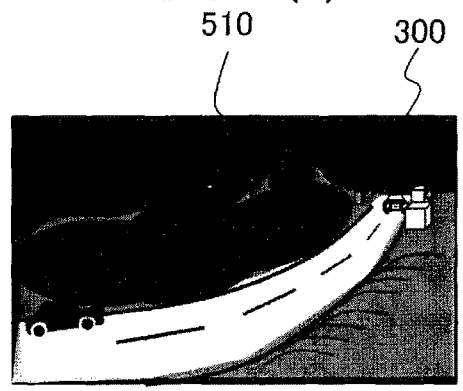
FIG. 10(a) is a diagram showing a case where a subject exists in a captured image acquired by the image capturing device in the nighttime when field illuminance is low (dark)

Here, the processing result of the image processing device 2 according to the second embodiment will be described below. FIG. 10(a) is a diagram showing a case in the second embodiment where a subject 510 exists in the captured image 300 acquired by the image capturing device 3 in the nighttime when the field illuminance is low (dark), wherein a state before performing the image processing in the second embodiment is shown. In the second embodiment, the operation until the operation of the texture judgment unit 140 selecting the image processing target regions is the same as that in the first embodiment, and the existence and the position of the subject 510 are indicated in the region 320 (referred to also as "the region in which the first texture amount is small") that is the image processing target region shown in FIG. 5 in which the first texture amount is less than or equal to the texture threshold value 211.

Since the subject 510 is situated at a long distance from the image capturing device 3, the subject 510 is captured as a minute object in the captured image 300. If the image processing (i.e., noise correction processing) is performed on the image processing target region 320 in this state, there is a possibility that the image part of the subject 510 is erroneously judged as noise since the region of the subject 510 in the captured image 300 is minute, and the subject 510 can disappear from the captured image 300 due to the noise reduction process when the subject 510 is judged as noise. Especially in the nighttime, the possibility that the subject 510 is judged as noise is high if the subject 510 has a light emission means such as an illuminating lamp or a blinking light.

Figure 10B:
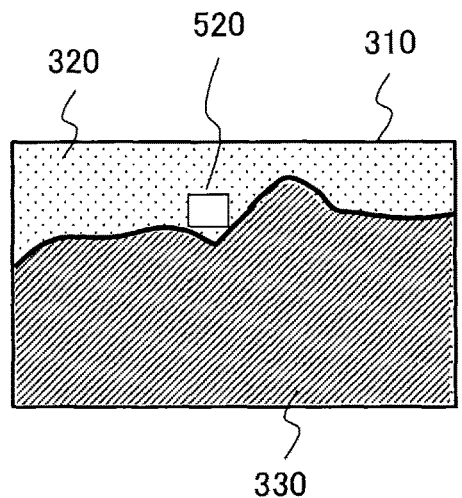
FIG. 10(b) is a diagram showing a case where a mask range on which the image processing is not performed is displayed in superposition on the divided region image after undergoing the processing by the image processing device according to the second embodiment.

FIG. 10(b) is a diagram showing a case where the rectangular range as the mask range 520 on which the image processing is not performed is displayed in superposition on the divided region image 310 after undergoing the processing by the image processing device 2 according to the second embodiment. The mask range 520 is situated in the region 320 being the image processing target region in which the first texture amount is small and at a position to include the position of the subject 510 in the captured image 300, and if the noise correction processing is performed in this state, the noise correction processing is not performed on the mask range 520 in which the subject 510 is situated, and thus the subject 510 does not disappear from the captured image 300 even if the subject 510 in the captured image 300 is a minute object. Therefore, the observer can visually recognize the subject 510 in the captured image 300. Further, an image easy to see for the observer can be obtained since the noise correction processing is performed on the region 320 in which the first texture amount is small excluding the mask range 520 in which noise is likely to occur.

It is also possible to display the outline of the mask range 520 by using an emphasis display such as colored frame lines. This allows the observer to more clearly recognize the position of the subject 510.

Incidentally, it has been assumed in the second embodiment that the information acquired by the subject position detection unit 160 is position information indicating the direction and the altitude of the subject (e.g., the longitude, the latitude, and the altitude). However, in a case where the information acquired by the subject position detection unit 160 also includes individual information (e.g., identification information or airframe information) on the subject, the size of the subject can be obtained, and thus the size of the mask range 520 may be determined based on the size of the subject and the distance to the subject. For example, when the distance to the subject is L, the number of pixels of the captured image in the width direction is w and the camera field angle of the image capturing device 3 is θ, the size Δd of the subject in units of pixels can be obtained by the following expression (3):

$$\Delta d = (2L/w) \cdot \tan(\theta/2) \tag{3}$$

When the size of the subject in the horizontal direction is W, based on the expression (3), a condition required for the number m of pixels necessary for the mask range in the width direction can be represented by the following expression (4):

$$m > W/\Delta d \tag{4}$$

Similarly, if the size of the subject in the vertical direction is known, the number of pixels necessary for the mask range in the longitudinal direction can be determined by calculation similar to the expression (4).

Further, while it has been assumed in the second embodiment that the subject position information is acquired from the subject position detection unit 160 in regard to each image captured by the image capturing device 3, in cases of video shooting, an image capture cycle of the image capturing device 3 and a subject position information acquisition cycle of the subject position detection unit 160 can differ from each other. In general, the image capture cycle of the image capturing device 3 is shorter than the subject position information acquisition cycle. In such cases, subject position information acquired previously is used for the determination of the mask range 520 until the next subject position information is acquired. For example, when the image capture cycle of the image capturing device 3 is 1/30 [sec] (i.e., 30 images are captured in one second) and the subject position information acquisition cycle of the subject position detection unit 160 is 1 [sec] (i.e., 1 image is captured per second), the mask range 520 is determined for the first image by using the subject position information acquired at that time, the mask range 520 determined from the subject position information regarding the former image is used for the subsequent 29 images, and the mask range 520 is newly determined when the next subject position information is acquired. In this case, it is desirable to set the mask range 520 at a sufficient size with a safety margin so that the next subject position fits in the previously set mask range 520.

In a case where speed information on the subject is included in the subject position information or a case where the moving speed of the subject can be estimated from past subject position information, the size of the mask range 520 may be determined as follows, for example: When the cycle of acquiring the subject position information is F [sec], the moving speed of the subject is r [m/sec] and the size of the subject in units of pixels is Δd [m], the distance (the number of pixels) p in the image for which the subject moves while the subject position detection unit 160 acquires the next subject position information can be represented by the following expression (5):

$$p = r \cdot F / \Delta d \tag{5}$$

Figure 11:
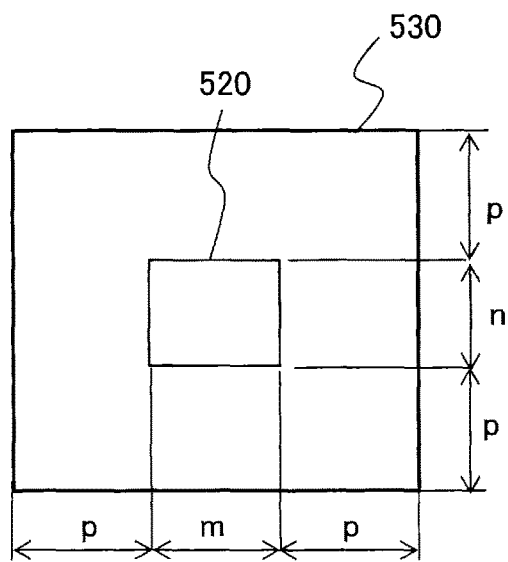
FIG. 11 is a diagram for explaining the size of a corrected mask range after undergoing speed correction in a case where a moving speed of the subject is known.

FIG. 11 is a diagram for explaining the size of a mask range 530 after undergoing speed correction in a case where the moving speed of the subject is known. Assuming that the size of the mask range 520 determined first is m in width and n in length, the mask range after the correction is m+2p in width and n+2p in length according to the expression (5). Incidentally, the reason for adding 2p to the original size respectively in the width direction and the longitudinal direction is that it is unknown whether the moving direction of the subject will be upward, downward, leftward or rightward. When the moving direction of the subject is known, the mask range 530 after the correction may be set in a size obtained by adding p to the original size in one of the upward, downward, leftward and rightward directions according to the moving direction of the subject.

(2-3) Effect

As described above, with the image processing device 2 according to the second embodiment, the noise processing is not performed on the mask range 520 where the subject 510 is situated, and thus the subject 510 does not disappear from the captured image 300 and can be visually recognized in the captured image 300 by the observer even when the subject 510 in the captured image 300 is minute. Further, an image easy to see for the observer can be obtained since the noise correction processing is performed on the region 320 in which the first texture amount is small excluding the mask range 520 where noise is likely to occur.

(3) Modification

While a monitoring target is a road in the above embodiments, usage examples of the image processing devices 1 and 2 are not limited to such examples. For example, the image processing devices 1 and 2 can be used for the purpose of monitoring an airdrome surface (airport surface, runway surface). In this case, the road in FIG. 3 corresponds to the runway surface, the subject (vehicle) corresponds to an airplane, and these constitute the region of high monitoring priority. Further, while the region of low monitoring priority is the airspace above the airdrome surface, the airplane can also be situated in the airspace in many cases, and thus employing the image processing device 2 makes it possible to display the subject (airplane) situated in the airspace to be easy to see while reducing the noise in the airspace as the region in which the first texture amount is small. In cases of an airdrome surface, position information on an airplane can be obtained from information provided from an airport surveillance radar or the like. For example, position information (distance, direction, altitude) and model information on an airplane in the airspace can be obtained by configuring the subject position information acquisition unit 50 to acquire SSR (Secondary Surveillance Radar) information and airplane flight information.

DESCRIPTION OF REFERENCE CHARACTERS 1, 2: image processing device, 3: image capturing device, 10, 10a: control unit (processor), 20, 20a: storage unit, 30: input interface, 40: output interface, 50: subject position information acquisition unit, 110: image region calculation unit, 111: image region dividing unit, 112: texture measurement unit, 113: image processing region selection unit, 120: image region readout unit, 130: luminance judgment unit, 140: texture judgment unit, 150: image processing unit, 160: subject position detection unit, 170: mask processing unit, 210: storage device, 220: memory, 211: texture threshold value (first threshold value), 212: image processing region information, 213: luminance judgment threshold value, 214: texture judgment threshold value (second threshold value), 215: camera installation information, 300: captured image, 301: road, 310: divided region image, 320: region in which first texture amount is small, 330: region in which first texture amount is large, 500: camera image plane, 510: subject, 520: mask range, 530: mask range after correction.

What is claimed is:

1. An image processing device that performs image processing for reducing image noise, comprising:
    a processor to execute a program; and
    a memory to store the program which, when executed by the processor, performs processing including
    dividing a first captured image into a plurality of image regions and determining an image processing target region based on a first texture amount indicating luminance variation in the plurality of image regions;
    measuring the first texture amount in a second captured image, said second captured image having been captured after said first captured image and including the image processing target region;
    judging whether the image processing on the second captured image is necessary or not based on luminance of the image processing target region in the second captured image;
    calculating a second texture amount indicating luminance variation in the image processing target region for which the image processing is judged to be necessary in said judging based on the luminance, and judging whether the image processing should be performed on the image processing target region or not based on the second texture amount; and
    performing the image processing on the image processing target region on which said judging based on the second texture amount is that the image processing should be performed.

2. The image processing device according to claim 1, wherein said calculating includes selecting an image region included in the plurality of image regions and in which the first texture amount is less than or equal to a predetermined first threshold value as the image processing target region.

3. The image processing device according to claim 1, wherein said judging based on the luminance includes judging that the image processing on the current captured image is necessary when the luminance of the image processing target region is less than or equal to a predetermined luminance judgment threshold value.

4. The image processing device according to claim 1, wherein said judging based on the second texture amount includes judging that the image processing on the second captured image is necessary when the second texture amount of the image processing target region is larger than or equal to a predetermined second threshold value.

5. The image processing device according to claim 1, wherein the first texture amount is variance indicating variation of pixel values in each of the plurality of image regions.

6. The image processing device according to claim 1, wherein the luminance of the image processing target region is a mean value of luminance values in the image processing target region.

7. The image processing device according to claim 1, wherein the second texture amount is a variation coefficient of pixel values in the image processing target region.

8. The image processing device according to claim 1, wherein the memory stores image processing region information indicating the image processing target region previously determined by said calculating.

9. The image processing device according to claim 1, wherein
    the memory stores position information on a camera that acquires the first and second captured images,
    the program which, when executed by the processor, performs processing including
    acquiring position information on a subject;
    transforming position coordinates of the subject in a real space into position coordinates in a camera image space of the camera; and
    setting a region including the position coordinates of the subject as a mask range in the camera image space when the subject is situated in the image processing target region in the camera image space, and
    the image processing is performed on the image processing target region excluding the mask range.

10. The image processing device according to claim 9, wherein said setting includes
    acquiring size information indicating a size of the subject and distance information indicating a distance from the camera to the subject from the second captured image, and
    determining a size of the mask range based on the size information and the distance information.

11. The image processing device according to claim 9, wherein said setting includes acquiring a moving speed of the subject from the second captured image, and determining a size of the mask range based on the moving speed, an acquisition cycle of acquiring the position information, and an image capture cycle of the camera.

12. The image processing device according to claim 9, wherein the mask range is displayed by using an emphasis display.

13. An image processing method of performing image processing for reducing image noise, comprising:

dividing a first captured image into a plurality of image regions and determining an image processing target region based on a first texture amount indicating luminance variation in the plurality of image regions;

measuring the first texture amount in a second captured image, said second captured image having been captured after said first captured image and including the image processing target region;

judging whether the image processing on the second captured image is necessary or not based on luminance of the image processing target region in the second captured image;

calculating a second texture amount indicating luminance variation in the image processing target region for which the image processing is judged to be necessary in said judging based on the luminance, and judging whether the image processing should be performed on the image processing target region or not based on the second texture amount; and performing the image processing on the image processing target region on which said judging based on the second texture amount is that the image processing should be performed.

14. A non-transitory computer-readable storage medium storing an image processing program that causes a computer to perform image processing for reducing image noise, wherein the image processing program causes the computer to execute processing comprising:

dividing a first captured image into a plurality of image regions and determining an image processing target region based on a first texture amount indicating luminance variation in the plurality of image regions;

measuring the first texture amount in a second captured image, said second captured image having been captured after said first captured image and including the image processing target region;

judging whether the image processing on the second captured image is necessary or not based on luminance of the image processing target region in the second captured image;

calculating a second texture amount indicating luminance variation in the image processing target region for which the image processing is judged to be necessary in said judging based on the luminance, and judging whether the image processing should be performed on the image processing target region or not based on the second texture amount; and performing the image processing on the image processing target region on which said judging based on the second texture amount is that the image processing should be performed.

* * * * *